United States Patent

[11] 3,599,483

| [72] | Inventor | Kenneth R. Larson<br>Des Plaines, Ill. |
| [21] | Appl. No. | 735,401 |
| [22] | Filed | June 7, 1968 |
| [45] | Patented | Aug. 17, 1971 |
| [73] | Assignee | Snap-on Tools Corporation<br>Kenosha, Wis. |

[54] TORQUE WRENCH TRANSLATING DEVICES
6 Claims, 6 Drawing Figs.

| [52] | U.S. Cl. | 73/139 |
| [51] | Int. Cl. | G01l 5/24 |
| [50] | Field of Search | 73/139, 1 |

[56] References Cited
UNITED STATES PATENTS

| 2,343,380 | 3/1944 | Larson et al. | 73/139 |
| 2,715,333 | 8/1955 | Larson | 73/139 |

*Primary Examiner*—Charles A. Ruehl
*Attorney*—Harry C. Alberts

ABSTRACT: The invention involves a self-contained torque-measuring wrench that is provided with an elongated lightweight member between a work-engaging member and a meter spaced therefrom to effectively translate the twist load in the work-engaging member to a calibrated meter with minimum friction and without variation for accurate meter measurement commensurate with the manually applied work-engaging turning load irrespective of whether or not frictional variations should develop owing to departures from the prescribed manual application of the turning force which may inadvertently occur. This is accomplished with an improved twist-translating arm and mount therefor which is subject to minimum frictional displacement and negligible deflection responses even though the applied directional manual force for fastener turning is not entirely in the plane of fastener rotation therewith.

PATENTED AUG 17 1971
3,599,483
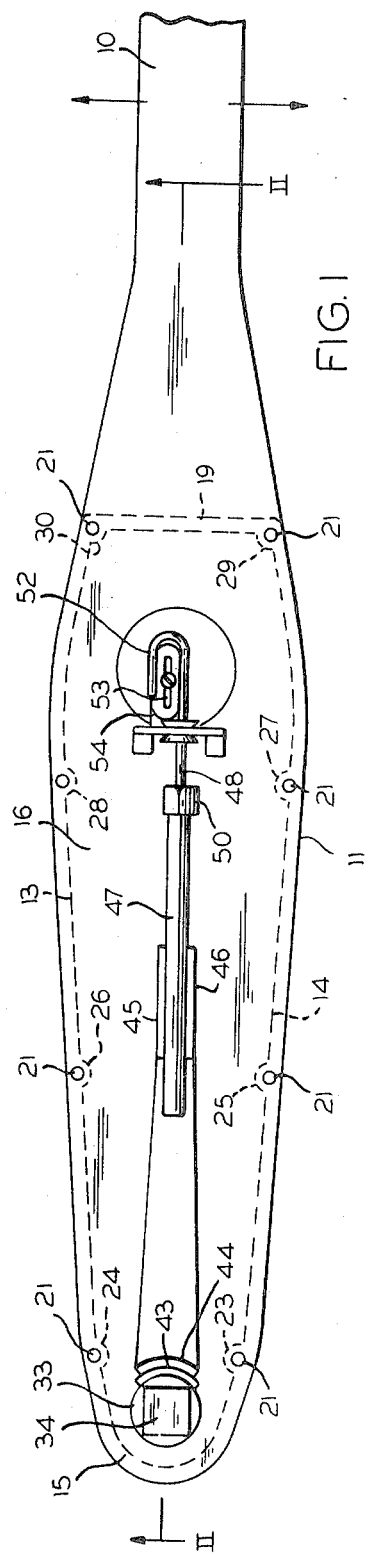
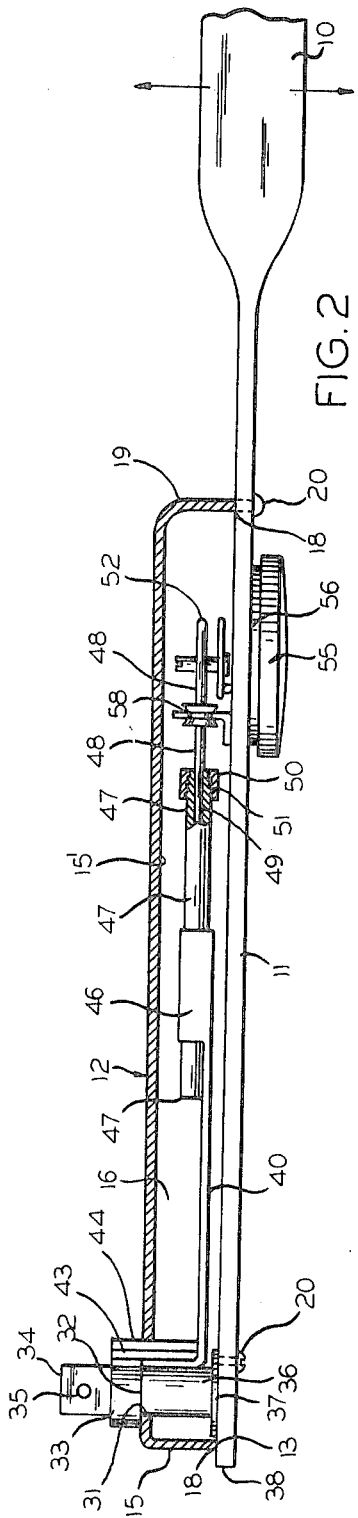
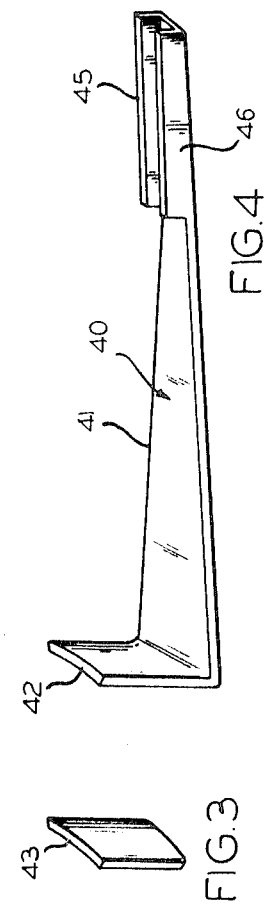
INVENTOR
KENNETH R. LARSON
BY *Harry C. Alberts*
ATTORNEY

TORQUE WRENCH TRANSLATING DEVICES

This invention relates to turning devices and more particularly to torque-measuring wrenches of the type disclosed in U.S. Pat. Nos. 2,312,104; 2,314,623 and 2,715,333, although certain features thereof may be employed with equal advantage for other purposes.

It contemplates more especially the provision of an improved, more dependable and accurate torque-measuring wrench that is practically free from internal stresses and friction in the moving parts for accurately designating the force applied in nut turning and similar movements over extended periods of time without any appreciable wear and variations caused by deflections and friction variations in the meter-translating parts.

Most torque wrenches measure the flex in a beam which resists the turning force of a wrench in order to determine the amount of torque or force applied in nut turning and similar operations. Then, too, the amount of torque has been measured by determining the degree of twist in a shank or shaft. The desirability of utilizing the degree of twist in the shank or shaft as the measuring expedient in nut turning and similar operations, has not been resorted to with the utmost advantage from the standpoint of translating the degree of twist to an indicator or meter at a point of maximum displacement so that accurate measurements can be recorded by reducing the error factor to a minimum by providing improved twist translation instrumentalities that are rigid in the measurable plane of twist and comparatively flexible in all other directions to avoid the introduction of error due to inadvertent mismovements of applied force.

The importance of accuracy in torque wrenches cannot be overemphasized, and the degree of accuracy depends largely upon the elimination of or substantial reduction in fatigue, friction, lag and free play between relatively moving parts. Then, too, measuring wrench users sometimes inadvertently apply the turning load in a direction other than the true plane of rotation for fastener turning, and these deviations tend to create variations in translation of twist functions which affect true meter readings. This is also important in torque wrenches that embody the principle of flexing a torque resisting beam to provide the desired reading; however, better results have been found possible in torsion type wrenches embodying teachings of the present invention.

In accordance with the teachings of the present invention, the torsion measuring principle has been embodied in the conventional type lever-arm wrench with minimum fatigue, mismovements in the applied turning force, friction, lag, free play, and maximum translation of the relative twist of the load carrying member. Torque measurements are possible, therefore, with minimum error introduction or with a negligible error factor under such adverse uses, and nut turning operations are more accurately measured under all conditions and capacities irrespective of any inadvertently misapplied directional forces on the lever-arm for effecting the turning operation.

One object of the present invention is to simplify the construction and improve the operation of devices of the character mentioned.

Another object is to provide a simple and compact torque-measuring wrench of the lever-arm type that is accurately and dependable in operation over an extended period and will not vary in its readings irrespective of the position of use or directional force applied to the handle for nut turning.

Still another object is to provide a torque-measuring turning tool having improved rigid and nonflexing torsion-translating means in the plane of applied forces for fastener turning having substantially nonfriction expedients associated therewith for more accurate measuring the torque applied in the desired turning direction of operation.

A further object is to provide a turning tool with a shank subjected to twist for operating measuring instrumentalities with a translation member rigid in the normal plane of applied force and comparatively flexible in other planes of applied force for providing more accurate meter responses, and having improved torsion-translating support means for insuring minimum friction during the translation movement to insure greater accuracy and dependability over an extended period.

A still further object is to provide a torque wrench with a turning shank having an improved rigid torsion-translating and torque indicating member extending therefrom for improved bearing support and operative connecting to measuring instrumentalities at a point of accentuated displacement.

Still a further object is to provide a wrench having a rigid handle element for attachment of a turning shank to a rigid plate extension thereof for applied turning movement to utilize the twist therein through the medium of a light, rigid, and roller-mounted twist-translating element connected to a calibrated meter at a point of greatest displacement responsive to torsional shank stresses and strains.

Other objects and advantages will appear from the following description of an illustrative embodiment of the present invention.

In the drawing:

FIG. 1 is a bottom plan view of a wrench embodying features of the present invention with the casing cover plate removed to illustrate the inner instrumentalities thereof.

FIG. 2 is a fragmentary sectional view taken substantially along line II–II of FIG. 1.

FIG. 3 is a perspective view of an arcuate reinforcing translation arm mount shown in position in FIGS. 1 and 2.

FIG. 4 is a perspective view of the shank torsion-translating arm normally disposed between the shank and measuring instrumentalities.

FIG. 5 is a perspective view of a roller that movably supports the translation arm.

FIG. 6 is a perspective view of the roller guiding bracket support.

The structure selected for illustration comprises a suitable handle member 10 of standard construction that terminates in an elongated rigid plate 11 stamped or otherwise shaped from steel or the like for sustaining the measured turning load within the capacities for which they are designed. The steel plate 11 confronts and serves as a closure for an elongated chambered housing 12 cast or otherwise shaped from aluminum or other suitable metal to present inclined sidewalls 13 and 14 terminating in a semicircular head end 15. The handle 10 with its elongated integral plate 11 and the confronting housing 12 providing a complemental chambered self-contained enclosure, are preferably though not essentially stamped, drawn or cast from suitable metals so as to possess the desired strength and lightness for convenient manipulation in manually applying the required force for nut turning as will appear more fully hereinafter. It should be noted that the sidewalls 13—14 not only converge toward the handle (FIG. 1) but also converge downwardly toward the bottom 15' to define a chambered interior 16 for confining the measuring instrumentalities in the housing 12 as will appear more fully hereinafter.

The peripherally flanged open edge 18 of the housing or casing 12 extends around the sidewalls 13—14 and their semicircular head 15 and handle end 19. The rigid face of the elongated plate 11 is shaped to correspond with the flanged open peripheral housing edge 18 to serve as a cover therefor.

A plurality of threaded screw fasteners 20 project through apertures 21 in the rigid elongated plate 11 to engage correspondingly threaded bores in the peripheral housing edge 18 that extends along the sidewalls 13—14 of the housing 12 and its ends 15 and 19, thereby enclosing the chamber 16 and confining the torsion displacing, indicating, and measuring instrumentalities to be described hereinafter. It will be noted that the elongated plate 11 and especially the inclined housing sidewalls 13—14 are reinforced in the region of the threaded bores by increasing the thickness of the cast peripheral edge flange 18 as at 23—24, 25—26, 27—28 and 29—30 so that the comparatively rigid and load-carrying elongated plate 11 can be effectively attached to the housing 12 which is greatly strengthened and reinforced therewith.

In fact, the housing 12 does not sustain any appreciable turning load and primarily serves to confine the measuring instrumentalities as a protection against foreign substances and impacts. The elongated plate 11 is sufficiently rigid to avoid any flex, distortion or consequential variation under turning load. The semicircular head 15 of the housing 12 is provided with a circular recess 31 corresponding substantially in curvature therewith and sized to receive a revoluble turning member 32 of substantially corresponding size for free rotation therein. The revoluble turning member 32 has an annular shoulder 33 formed, in this instance, integral therewith immediately above a polygonal wrench socket receiving extremity 34 which terminates externally of and beyond the bottom 15' of the housing 12 for projecting through the circular recess 31 provided in the housing head 15. A spring-impelled detent 35 of standard construction is provided in a face of the polygonal extremity 34 for cooperation with a correspondingly sized and shaped recess provided in a wrench socket or other turning implement that is telescoped thereon for retention thereon against accidental detachment.

Wrench sockets or other turning implements (not shown) would normally be provided with a recessed shank shaped and sized to conform with the polygonal extremity 34 of the revoluble turning member 32 so that the friction exerted by the spring-impelled detent 35 would be effective in retaining the turning implement thereon against accidental removal. As shown, the revoluble member 32 has a cylindrical shank 36 constituting a turning shank which, in this instance, is formed integral with the annular shoulder 33 and polygonal extremity 34 in axial relation therewith. The cylindrical twist-resisting shank 36 terminates for contact at its base extremity 37 in a polygonal stationary shoulder with the interior head portion of the steel elongated plate 11 for welded joinder therewith as at 37 around the semicircular head 38 thereof. This rigidly anchors and attaches the work-engaging turning shank 32—33—36 to the elongated plate 11 proximate to its unobstructed head end opposite to the handle end 10 so that it is accessible to fasteners for rotary turning and loading to operate as a single fixed member. The head portion of the elongated plate 11 has a semicircular extremity 38 that conforms in size and shape with the semicircular head 15 of the housing 12.

With this arrangement, the turning member 32 projects through the chamber 16 of the housing 12 so that the polygonal extremity 34 will be exteriorly accessible beyond the bottom 15' thereof for engagement and disengagement with turning members such as variously sized wrench sockets and the like for fastener turning. It should be noted that the revoluble work-engaging member 32 is rigidly attached to the elongated plate 11 that is preferably of rigid and nonyielding material such as steel while the body or housing 12 may be cast or otherwise shaped from aluminum in that the revoluble turning work-engaging member 32 is mounted for movement relative thereto in sustaining the turning load. The housing 12 does not directly carry any appreciable load. Turning movement is imparted to a fastener such as a threaded nut through a wrench socket attached to the polygonal extremity 34 of the revoluble turning work-engaging member 32 responsive to manual force or effort applied to the handle 10 in one direction or another.

In order to measure the tightness to which any fastener such as a threaded nut is applied through the manipulation of the handle 10, the extent of twist sustained by the cylindrical shank 36 of the revoluble turning work-engaging member 32 is determined in that this will be uniform for any predetermined applied force and will vary proportionately to the turning load imparted through the handle 10 that is primarily sustained by the rigid elongated plate 11. It will be observed that any turning movement applied to the handle 10 will be transferred to the elongated plate 11 which, in turn, will rotarily displace the revoluble turning work-engaging member 32 that carries a nut or other turning implement to the end that proportional twist is imparted to the cylindrical shank 36 anchored to the handle 10 and cover elongated plate 11 at one extremity 37 and free to twist at the other extremity 34 responsive to carrying the turning load.

In order to measure the degree of twist or torsion imparted to the cylindrical shank 36 of the revoluble work-engaging member 32 responsive to any turning operation, an elongated measuring instrument actuator 40 better termed a twist-translating arm projects radially from the turning shank annular shoulder 33. The twist-translating arm 40 comprises, in this instance, an elongated comparatively thin flat tapered plate member 41 having a vertically offset end 42 transversely arcuate for fitting contact with the shank 36 under the annular shoulder 33 for welded joinder therewith. The tapered plate 40—41 is sufficiently thin to flex in all directions of exertion thereon except in the plane thereof which is sufficiently expensive or large in area to provide rigidity to accurately translate the degree of load twist to which the work-engaging member 32—33—36 is subjected. Reinforcing arcuate plates 43—44 abut against the translating arm offset 42 and the annular shoulder 33 for welded connection to provide a rigid mount for the twist-translating plate member 40—41 to operate as an integral member.

The tapered plate member 41 is preferably though not essentially stamped from sheet material to present spaced upstanding guide plates 45—46 for rigidity and lightness, and to frictionally receive a rod extension 47 that projects longitudinally of the housing 12 for confinement therein. So that the housing 12 together with its associated instrumentalities may be as compact as possible, the cylindrical indicator displacing rod extension 47 is preferably disposed in the plane of the actuator plate 41 (FIG. 2) to avoid contact with either the housing bottom 15' or elongated plate 11 and free to circumferentially move or oscillate for a limited extent depending upon the degree of twist imparted to the work-engaging member shank 36 or the torsion effect therein responsive to carrying the turning load relative to the elongated plate 11. This twist-translating plate member 41 is light but rigid in the plane of turning movement to turn with the twist of the torsion shank 36 but is comparatively flexible in a plane normal or angularly thereof to avoid transmitting any other handle movements inadvertently applied by the user. This arrangement balances the instrumentalities symmetrically of the load-carrying shank annular shoulder 33 so as to avoid any flex therein irrespective of the position of the load applying handle 10 and that of its plate 11.

The elongated indicator displacing twist-translating actuator plate 41 and rod extension 47 need only be heavy enough to overcome the friction in the measuring instrumentalities and the load occasioned by their operation without causing any flex therein by its own weight or in translating the torsional displacement of the shank 36. Its thickness and flaring size, however, may be determined by other factors such as the elimination of backlash and conditions of abuse in actual nut turning operations. For that reason, the elongated twist-translating plate member 41 and rod extension 47 in actual practice may be somewhat heavier than otherwise required merely to carry a comparatively negligible load of operating the measuring instrumentalities without any flex therein; therefore the thin flared sheet construction of the plate actuator member 41 is thought to be highly advantageous.

It may be more desirable from a manufacturing standpoint to terminate the elongated cylindrical rod extension 47 in a rod tail 48 of comparatively small diameter. To this end, the rod tail 48 has one extremity projecting within an axial slitted bore 49 provided in the extremity of the rod 47. This extremity of the rod tail 48 is frictionally engaged in the bore 49 by means of a tapered tightening nut 50 that threadedly engages a correspondingly tapered complemental extremity 51 of the rod extension 47 to effect rigid connection of the rod tail 48 with the elongated cylindrical actuating rod extension 47 for the measuring instrumentalities (FIG. 2). The tapered complemental extremity 51 of the rod extension 47 is provided with longitudinal slits (not shown) in the region of the axial bore 49 to provide the desired contractual resiliency responsive to tightening the nut 50.

With this arrangement, the rod tail 48 may be extended or retracted within the axial bore 49 of the rod extension 47 to enable longitudinal adjustment of the rod extension 47 relative to the indicator mechanism fully disclosed and described in the aforesaid letters patents and to be hereinafter briefly described. The longitudinal adjustment of the rod tail 48 will vary the extent to which the dial mechanism is actuated or displaced responsive to a predetermined torsional stress imparted to the shank 36 of the work-engaging member 32. This enables also the replacement of the rod tail 48 should occasion demand or should such become impaired in any nut turning operation. It should be noted that the rod extension 47 together with its reduced tail 48 are of a comparatively small diameter so that the latter will be sufficiently flexible to yield under abnormal conditions of use to protect the delicate indicator and measuring mechanism in the event of backlash caused by the sudden manual release of the handle 10 while loaded, and this backlash will be absorbed by the flexing of the rod tail 48 which serves as a recoiling feature expedient under such conditions; however, the rod extension 47 with its tail 48 functions exactly the same even though these were turned or otherwise shaped to constitute an integral unit; however, such construction would be somewhat more expensive from a production standpoint than the coaxial connected rods 47—48 serving as an actuator for measuring instrumentalities when displaced by the twist imparted to the shank 36.

The reduced rod tail 48 has, in this instance, a right-angularly offset U-shaped extremity 52 which projects transversely within the housing chamber 16 near the bottom end thereof for registry in a longitudinally elongated slot 53 provided in a lever 54 that comprises a part of measuring and indicating instrumentalities 55 described in detail in the above-referred-to Letters Patents and which need not be repeated herein. It should be observed that the offset extremity 52 of the rod tail 48 will be displaced within the elongated slot 53 of the dial mechanism lever 54 responsive to longitudinally adjusting the rod tail 48 relative to the rod extension 47. This variation in the position of the rod tail offset extremity 52 within the slot 53 of the lever 54, will enable the correct setting or resetting of the dial mechanism for any particular load. This will readily insure accuracy by the simple adjustment and positioning of the rod tail 48 relative to the rod extension 47, to indicate the nut turning torque load as is more fully illustrated and described in U.S. Pat. No. 2,715,333 dated Aug. 16, 1955 (FIG. 11).

The measuring instrumentalities 55 which are assembled as a unit to the dial casing plate 56 are attached in any suitable manner to the exterior surface of the lower region of the handle plate 11. Consequently, measuring and indicator mechanism can be attached to the elongated plate 11 together with the revoluble turning work engaging member 32 and its torsion displacing translating actuator arm 41 and rods 47—48. The plate 11 together with these instrumentalities are, in turn, attached for confinement in the chamber 16 of the housing 12 by means of fasteners such as the threaded screw fasteners 20. It will be apparent from the foregoing arrangement of parts that a manual turning force applied to the handle 10 will impart a corresponding turning effect to the revoluble turning work-engaging member 32. This creates a slight twist in the shank 36 which can be measured with the advantage procured through the moment arm dial indicator translating member therebetween.

In order to guide the shank translation arm 40—41 which is the actuator for the calibrated measuring instrumentalities 55 with minimum friction and, further, to avoid any inclination of the manually applied force on the handle 10 in a direction inadvertently other than the intended load turning handle plane, a peripherally grooved roller 57 (FIGS. 2 and 5) is journaled on the rod tail 48 (FIG. 2). The peripheral roller groove 58 registers with a laterally open elongated slot 59 providing a track therefor in a bracket 60. The bracket 60 has offset bottom flanges 61—62 which affords spot-welded attachment thereof to the inner face of the elongated flat plate 11 intermediate the ends of the rod tail 48. Thus the translation member 40—41 is movably supported by the roller 57 as it rides the lateral track slot 59 of the rigidly anchored bracket 60.

The roller 57 serves to support the otherwise free end of the translation member 40—41 and permit the guided displacement thereof during the to and fro movement occasioned by the loading and unloading of the shank 36 which through its polygonal extremity 34 and an attached wrench socket or screwdriver, registers with and engages the fastener for tightening and loosening thereof. During this function, the turning load twists the shank 36 commensurately with the turning load and through the attached translation arm or actuator member 40—41, operates the measuring instrumentalities 55. This more or less frictionless movement eliminates any molecular strain in the metal parts, avoids the generation of any heat hysterises, and avoids molecular degeneration.

Further, any inadvertent load-applying force in an upwardly or downwardly inclined direction or directions that were beyond the true load turning plane, would not distort the true measurement of the turning load. This arrangement also permits the translation member 40—41 to be light in construction and comparatively flexible in a direction normal to the flat surface thereof which by reason of its flared shape is light in weight and yet very rigid in the plane of its flat surface which is also in the plane of the applied true turning load.

This turning operation is transmitted to a suitable fastener or tool or implement or fastener such as a threaded nut which requires a predetermined turning load in securing it to the desired degree of tightness for the suitable performance of its intended function. This turning movement and sustained turning load will create a fractional twist in the revoluble shank 36 between its annular shoulder 33 and the base extremity 37. This fractional twist created by the torsional effect on the cylindrical shank 36, will be translated to and operate the measuring instrumentalities 55. The degree of twist or torsional strain within the shank 36 is measured at the extreme end of the elongated rods 47—48 which is the point of its greatest displacement.

As a result, the rods 47—48 will accentuate the twist created in the shank 36 to effect its return to the indicator pointer to an extent proportional to the length of the elongated rods 47—48. The measurement of the twist imparted to the shank 36 at a point of maximum displacement of the comparatively long twist-translating rods 47—48 is an important factor in producing accurate readings. Then, too, the rods 47—48 need only be heavy enough to overcome the comparatively negligible force required to actuate the measuring instrumentalities so that comparatively little friction is encountered between the revoluble turning work-engaging member 32 and the measuring instrumentalities. This is conducive to accuracy accomplished with utmost simplicity in construction and operation. With the arrangement of parts above described, the rods 47—48 comprising a single or sectional member is of such flexibility as to preclude injury to the dial mechanism in the event the handle 10 is abruptly released or the turning load should fall by virtue of a rupture in the nut or bolt or other instrumentality that is being tightened. The rather flexible rod 48 would absorb a substantial part of the shock without permitting such to damage the dial mechanism or any part thereof under abnormal conditions of abrupt release. Any backlash occasioned by the abrupt accidental release of the turning load would ordinarily jar, impair and render permanently defective the measuring instrumentalities.

This can be largely overcome by the actuator rod tail 48 which is highly flexible, resilient and possessed of only sufficient rigidity to overcome the measuring instrumentalities connected thereto. Consequently, the severe stress and strains resulting from any backlash action, will be absorbed for the most part by the flexing of the translation plate member rod tail 48 and thus protect the measuring instrumentalities in any type of beam device under such abnormal conditions of abusive operation. The steel spring wire rod tail 48 is sufficiently rigid to carry the comparatively small load involved in actuating the indicator instrumentalities without any flex therein and yet sufficiently resilient to absorb any shock created in the abnormal operation of the turning head or revoluble work-engaging member 32.

Then, too, the torsional displacement in a torsion-type wrench embodying a short load-turning shank 36, is comparatively small in that the degree of twist therein would be a minute amount approximating five-thousandths of an inch under normal loads. Because the elongated translation plate 41 and adjustable plate member extension rods 47—48 actuates the dial mechanism at its (rods 47—48) point of maximum displacement, this minute torsional displacement of the load carrying shank 36 is appreciably translated and accentuated at the dial end of the twist-translating plate extension rods 47—48. Even though there was an abrupt release of load, therefore, the backlash in the aforesaid structure would be negligible and the rods 47—48 would not be called upon to withstand any appreciable backlash shock which could, however, be absorbed by the resilient rod tail extension 48 which is preferably constructed from small diameter spring steel wire.

With the arrangement of parts above described, it will be apparent that a very simple, inexpensive and highly accurate torque-measuring wrench has been provided wherein there are few moving parts and the friction thereof has been reduced to a minimum to preclude variable and inaccurate readings. These features coupled with the fact that the torsional stress created by the turning load is measured at the point of maximum displacement of the elongated dial mechanism twist translation plate member extension rods (47—48) eliminates or reduces to a negligible minimum any inaccuracies even at small loads.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A torque wrench comprising an elongated handle plate member having an unobstructed work-engaging head end opposite to the handle end a torsion-resisting work-engaging head member anchored substantially normal to said handle plate member proximate to the unobstructed head end of said plate member, an elongated comparatively thin flat plate torsion-translating member anchored at one end thereof to said work-engaging head member and extending along said handle plate member in spaced relation thereto, said elongated torsion-translating member being rigid against flex or yield in the plane thereof and flexible in all other directions of exertion thereon for extending intact freely along and substantially parallel to said handle plate member without sustaining the work resisting load of said work-engaging head member, calibrated indicating means on said handle plate member proximate to the handle end thereof for operative connection to the end region of said torsion-translating plate member to measure the turning load on said work-engaging head member and translated thereto by said elongated torsion-translating member responsive to sustaining a turning load with a turning force applied to said handle member, extension means connecting the end region of said torsion-translating plate to said calibrated indicating means, and substantially frictionless guide and mounting means between said extension means and said handle plate member.

2. A torque wrench as defined in claim 1 wherein the elongated comparatively thin plate torsion-translating member is flared, said torsion-translating member being anchored at its wide end to said work-engaging head member and said extension means comprises a resilient rod carried by said torsion-translating member at its narrower end.

3. A torque wrench as defined in claim 2 wherein said flared thin plate has its planar surface parallel to said handle plate member and its maximum rigidity is substantially in a plane parallel to the handle applied turning load movement.

4. A torque wrench as defined in claim 3 wherein said flared thin plate terminates in confronting upstanding brackets and the rod extension therefor is press fitted therebetween.

5. A torque wrench as defined in claim 1, wherein said guide includes a roller on said extension means to confront said handle plate member.

6. A torque wrench as defined in claim 5 wherein said roller has a peripheral groove for tracking in a slot formed in said guide.